United States Patent [19]

Landaeus

[11] 3,861,815
[45] Jan. 21, 1975

[54] ARRANGEMENT FOR RELEASABLY MOUNTING OF A HUB OR A WHEEL ON A SHAFT

[76] Inventor: Kjell Gustav Landaeus, Stora Tomagaten 29 22351, Lund, Sweden

[22] Filed: Dec. 4, 1972

[21] Appl. No.: 311,547

[52] U.S. Cl.............. 403/370, 403/227, 403/372, 192/76, 192/88 b, 64/27 NM
[51] Int. Cl............................................. F16d 1/06
[58] Field of Search........ 279/1 Q, 2, 4; 403/5, 225, 403/227, 370, 372; 24/263 DA, 263 DD, 263 DG, 263 DH, DIG. 26; 285/107, 109, 162, 196, 216, 338; 277/105, 108, 112; 192/88 B; 64/27 R, 27 NM

[56] References Cited
FOREIGN PATENTS OR APPLICATIONS
408,552   9/1966   Switzerland

*Primary Examiner*—Jordon Franklin
*Assistant Examiner*—Conrad L. Berman
*Attorney, Agent, or Firm*—Silverman & Cass, Ltd.

[57] ABSTRACT

A device for releasably mounting a wheel on a shaft in which a double walled sleeve having a closed end and an open end is positioned between the wheel and the shaft. An elastic pressure medium is enclosed within the recess formed by the two walls of the sleeve and sealed therein by a washer and nuts positioned over the open end. Upon securing the nuts on the sleeve, the pressure medium is compressed to move the sleeve walls radially and secure the wheel on the shaft.

10 Claims, 7 Drawing Figures

ARRANGEMENT FOR RELEASABLY MOUNTING OF A HUB OR A WHEEL ON A SHAFT

The present invention generally concerns releasably mounting of a hub or a wheel on a shaft, and more particularly the invention refers to an arrangement for releasably mounting of a hub or a wheel on a shaft, which arrangement includes a double wall sleeve forming a recess between the walls closed at one end of the sleeve, said sleeve being provided between the hub or wheel and the shaft, whereby the sleeve may be brought to change its radial dimension by bringing the pressure of a pressure medium inclosed in the recess to change, whereby the pressure changes are obtained by a relative displacement between the sleeve and a piston which is displacably mounted in the said recess and rests against the pressure medium.

The main object of the present invention is to provide a coupling means for fixedly mounting a hub or a wheel on a shaft, and in particular to provide such a coupling means, which may easily be released when disconnecting the hub or wheel and the shaft. The connection means should provide a mechanical connection between machine parts by means of standard elements with only reasonable demands on tolerances of the parts to be connected. The connection should be performed without causing deformations of the connected parts. The connection means should be simple enough to be handled by non-skilled persons, and the connection means should be formed so as to enable not only connection of a shaft and a hub or wheel but also for the connection of two tubes or shafts extending rectlinear with each other.

A connection means of the above mentioned general type is previously known from for instance the Swiss Pat. No. 408,552, but the said previously known connection means is diadvantageous in several ways. This mainly depends on the fact that the flow of forces run both through the connection element and the hub or wheel. This necessitates several working operations of the hub or wheel, and standard wheels or hubs may not be used without working thereof. Further it is necessary to provide holes in the hub or wheel for the screws of the connection element, and an axial stop must be provided in the hub or wheel for the whole ring of the connection element including the pressure medium.

The present invention intends to remove the above disadvantages in the previously known connection means and to provide an arrangement of the above mentioned type. As a general example of the invention, a preferred embodiment will be further described, in which the inner cylindrical branch of the sleeve is threaded in the outer end thereof and engages a ring-formed piston which is in the corresponding way threaded and which may be screwed into the recess between the two walls of the sleeve thereby compressing the pressure medium inclosed in the said recess, whereby the pressure medium in turn acts against the walls thereby forcing them apart, so that the said walls are forced against the shaft and the hub or wheel respectively.

This embodiment of the invention provides a good connection between the shaft and the hub or wheel, and removal may easily take place by screwing the piston out, whereby the double walled sleeve substantially regains its original form free from connection with the shaft and the wheel or hub, respectively.

The screwing of the threaded piston into the threaded sleeve may, however, sometimes cause problems since a relatively large torsional moment is necessary between the sleeve and the piston, and further, some form of reaction means is necessary in the sleeve in order that this should not be turned at the same time as the piston. The torque transmission is also limited in the above mentioned embodiment of the invention due to the fact that only one of the sleeve ends transmits torque between the shaft and the hub or wheel, viz. the end which forms the bottom of the sleeve. Further, a part of the connection means extends out of the hub and may in some cases be deemed to have an unnecessarily large axial extension.

In the basic embodiment of the invention very strong local strains are present in the closed end of the sleeve, and it is a desire to reduce the said strains, which may according to the present invention be accomplished by foreseeing that the pressure from the pressure medium in the sleeve recess does not act so close to the passage between the outer branch and inner branch of the sleeve.

These and other advantages and improvements of the invention will be evident from the following detailed description of a number of embodiments of the invention which will be made with reference to the accompanying drawings. In the drawings.

Figure 1:
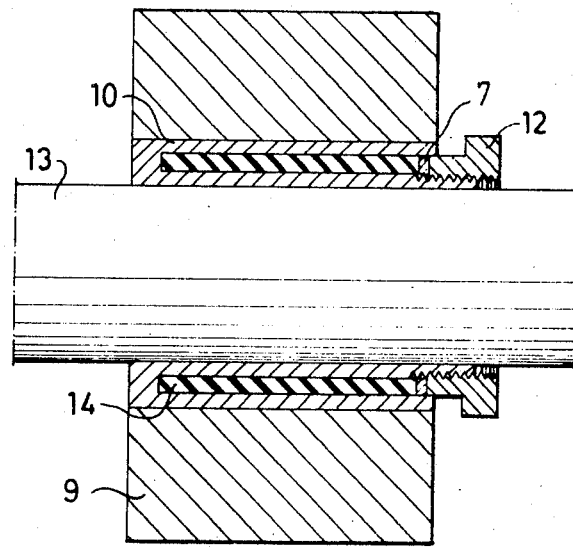
FIG. 1 is an axial cross-sectional view taken through a basic embodiment of a connection means constructed according to the invention, by which a wheel is mounted on a shaft.
Figure 7:
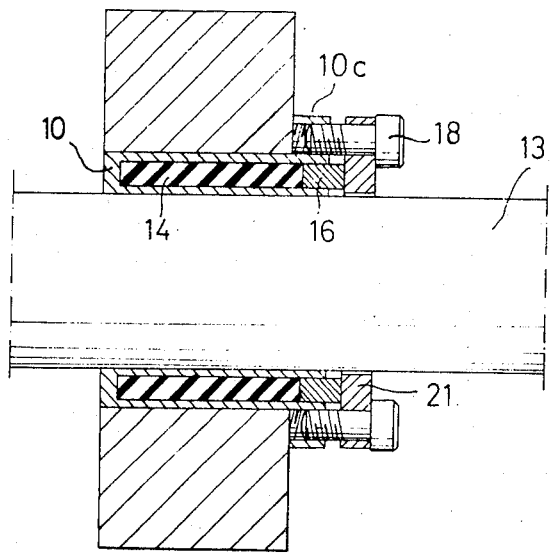
Figure 3:
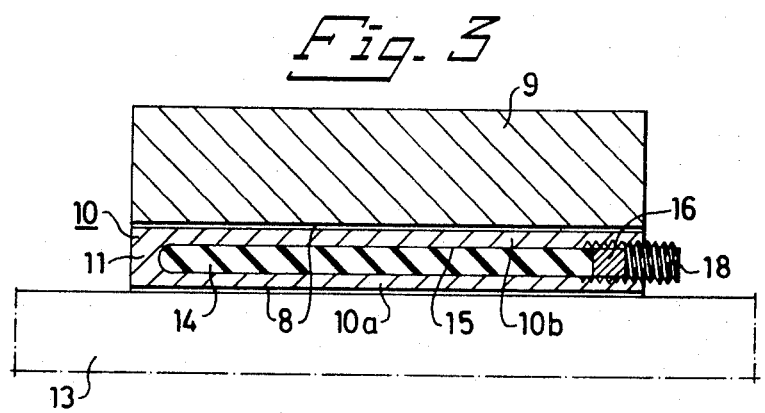
FIG. 3 is a sectional view taken along the line II—II of FIG. 2 in the direction indicated generally.
Figure 4:
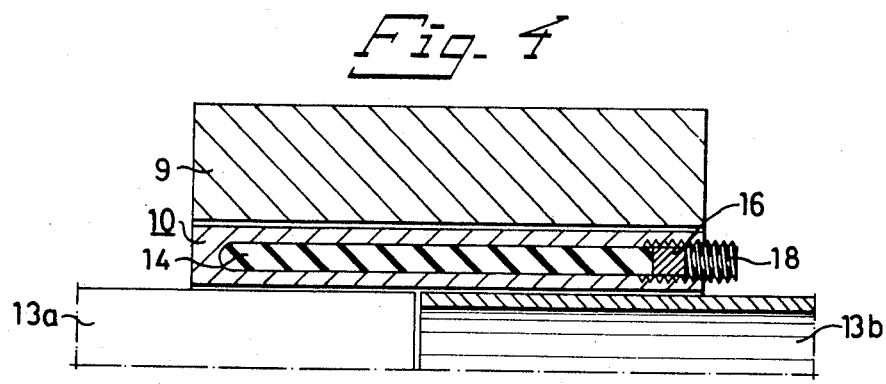
Figure 5:
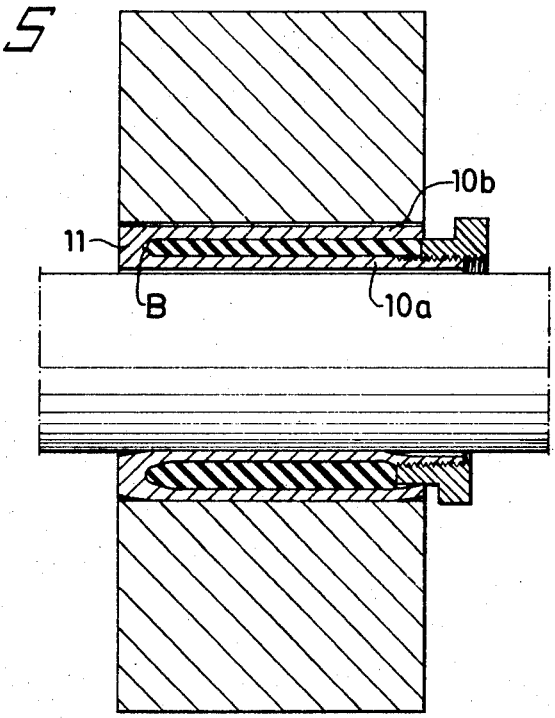
Figure 6:
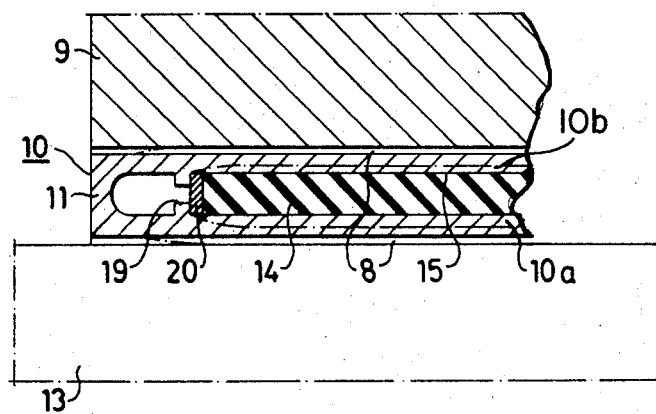

FIG. 4. is a view similar to FIG. 3 but showing the connection means connecting a wheel and two axially aligned shafts of the same or substantially the same diameter;

FIG. 5 is a generally schematical cross-sectional view similar to FIG. 1 but illustrating the forces which may be present in some parts of the connecting element;

FIG. 6 is a fragmentary sectional view through an alternate embodiment of the invention in which it has been possible to reduce some strains due to such forces; and FIG. 7 is a view similar to FIG. 6 illustrating a further alternate embodiment of the connecting element of the invention.

The connection means according to the invention is intended for butt connection of a wheel 9 with a shaft 13, and the connection means 10 comprises a double walled sleeve formed by an inner sleeve 10a and an outer sleeve 10b radially offset from each other and being kept together at one end of a connection rib 11. The sleeve 10 is preferably made by two separate sleeves 10a and 10b, which are welded together or connected by means of the connection rib 11 in any other suitable way. The sleeve may however also be manufactured by turning out a recess 15 between the two sleeve parts.

As shown in FIG. 1, the sleeve 10 has a U-shaped cross section and one end of the sleeve is open. An elastic pressure medium 14 such as for instance rubber, is inclosed in the recess 15 of the sleeve and together with a washer 7 of metal or synthetic resin and a nut 12, the sleeve 10 with the inclosed pressure medium 14 forms a releasable coupling element. When mounting a wheel 9 on a shaft 13, the coupling element is pushed into the space between the wheel and the shaft, whereupon the nut 12 is screwed in, so that the pressure increases to a suitable level in the pressure medium. The washer 7, which may be deleted, acts as a sealing member for the pressure medium and facilitates the screwing in by reducing the friction between the nut and the pressure medium. The shaft 13 and the wheel 9 are now connected by the separate coupling element.

Figure 2:
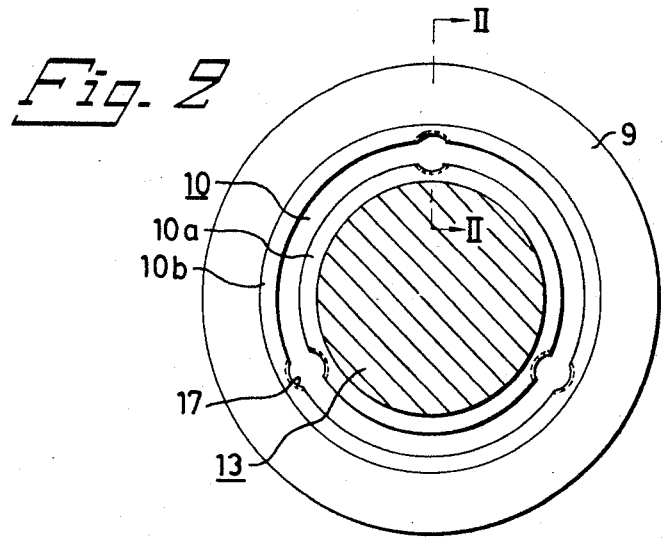
FIG. 2 is an axial cross-sectional view of a modified embodiment of the invention illustrating connection between a wheel and a shaft.

With reference to FIGS. 2 and 3, the recess 15 is to its greatest extent filled with an elastical pressure medium, such as for instance rubber, and in the open end the recess 15 receives a collar piston 16. The purpose of this piston is to cause a compression of the elastic pressure medium, and for this purpose at least three symmetrically arranged threaded holes 17 are provided between the inner sleave 10a and the outer sleeve 10b, and in said threaded holes 17 screws 18 are provided by means of which the pressure medium 14 may be compressed.

The coupling element is provided with a space 8 between the element itself on one hand and the wheel or hub 9 and the shaft 13 on the other hand. In the drawings the space 8 is exaggerated for the sake of clearness. When screwing the screws 18, the elastic pressure medium 14 is compressed, and in proportion to the increasing inner pressure in the pressure medium the inner sleeve 10a and the outer sleeve 10b are forced apart and are pressed against the shaft 13 and the hub 9, respectively. The screws 18 may be screwed into the sleeve 10 without holding the sleeve, and when fully screwed, the ends of the screws, which may be provided with key spanner holes, are preferably located within the sleeve 10, so that no parts thereof extend out of the sleeve. The screws 18 serve the two objects of both providing a compression of the pressure medium 14 and increasing the torque transmission between the inner sleeve 10a and the outer sleeve 10b. If it is desired to further increase the said torque transmission, a collar piston 16 may be provided with extensions corresponding to the screw holes 17, whereby a butt connection is provided also in the open end of the sleeve by assistance of the collar piston, and thereby it is made possible to increase the pressure by means of which the pressure medium 14 is compressed, without risk of damage to the connection rib 11, which may otherwise occur, as will be further explained below. In both cases, the torque is transmitted by the screws 18.

In FIG. 4, it is shown how the coupling element may be used for connection of two shafts 13a and 13b of substantially the same diameter. The coupling element may as well be used for connecting two wheels on a common shaft and in some cases also for connecting several wheels with several shafts.

In the embodiment shown in FIG. 5, which is the one shown in FIG. 1, the torque transmission between the inner sleeve 10a and the outer sleeve 10b substantially only takes place in the connection rib 11 at the end connecting the two sleeve parts. The strains are most critical in the connection rib 11, and the strains arise both due to shearing caused by the torque transmission forces and due to traction caused by the pressure from the pressure medium 14 and due to the bending which arises in the point B when the sleeve parts 10a and 10b tend to bend out towards the hub and the shaft respectively, when the pressure of the pressure medium is caused to increase. The strains due to bending are the comparatively largest part of the strains in point B, and the larger the play between the coupling element and the parts to be connected together, the larger the bending stresses will become. By distributing the bending over a comparatively longer part of the coupling element, it is possible to essentially reduce the bending stresses which otherwise, to a great extent, limit the maximum force with which the pressure medium may be compressed and thereby the maximum torque which may be transmitted by means of the coupling element. By elementary stress calculation it is possible to state in an easy way that if the length is doubled over which the bending takes place, the bending stresses will be reduced to one fourth.

Such an increase of the bendable part of the sleeve parts 10a and 10b of the coupling element may be established, for instance, as indicated in FIG. 6, where the recess 15, a short distance from the closed end of the sleeve, is formed with an annular shoulder 19 against which a washer 20 rests loosely. The washer 20 receives and transmits the pressure from the pressure medium 14 to the annular shoulder 19 and thereby to the inner sleeve 10a and the outer sleeve 10b.

In the lower part of FIG. 5, there is schematically shown how the bending takes place over a short distance of the sleeve and to a point on line with the point B, and in FIG. 6 it is indicated by dotted lines how the bending takes place over an essential length of the sleeve, viz. from the bottom of the recess 15 to a point on line with the washer 20.

The embodiment of FIG. 7 is similar to the one shown in FIG. 4, but the outer sleeve 10b ends with a radially outwards extending collar, and the collar piston 16 may be forced against the pressure medium 14 by means of a ring 21 which is connected to the collar 10c by means of screws 18, which are threaded into the collar 10c.

It is to be understood, that the invention is not limited to the above described and shown embodiments, but many modifications may be present within the scope of the appended claims.

What we claim is:

1. Arrangement for releasably mounting a wheel or the like on a shaft, the arrangement comprising, a sleeve having double walled sidewalls adapted to be located between the wheel and shaft forming a recess between the sleeve double sidewalls, said sleeve being closed at one end, an elastic pressure medium enclosed in the recess, the radial dimension of the double walled sidewalls being variable by changing the pressure on the pressure medium in said recess, a piston displaceably mounted in the recess resting against the pressure medium to act thereon for changing the pressure thereagainst, means, including the double walled sidewalls of the sleeve and piston being directly connected to each other such that application of an axial force upon the piston operates against the pressure medium and is reacted by a reaction force extending only through the sleeve.

2. Arrangement as claimed in claim 1 in which the piston is a collar piston which may be forced into the recess of the double walled sleeve by means of several screws which are threaded in part in the outer wall of the sleeve and in part in the inner wall of the sleeve.

3. Arrangement as claimed in claim 1 in which the piston is threaded and cooperates with threads in the sleeve recess, whereby the piston may be screwed into the sleeve recess.

4. Arrangement as claimed in claim 3 in which the piston is a collar piston having inner threads and the inner wall of the sleeve has corresponding outer threads.

5. Arrangement as claimed in claim 4 in which the inner wall of the sleeve recess extends axially outside the outer wall of the sleeve recess.

6. Arrangement for releasably mounting a wheel or the like on a shaft, the arrangement comprising, a sleeve having double walled sidewalls adapted to be located between the wheel and shaft forming a recess between the sleeve double sidewalls, said sleeve being closed at one end, an elastic pressure medium enclosed in the recess, the radial dimension of the double walled sidewalls being variable by changing the pressure on the pressure medium in said recess, a collar piston displaceably mounted in the recess resting against the pressure medium to act thereon for changing the pressure thereagainst, means, including the double walled sidewalls of the sleeve and piston being directly connected to each other, an annular ring disposed about the sleeve engaging the piston, the piston being forceable into the recess by movement of the ring towards the open end of the sleeve, the outer wall of the sleeve having a radially outwardly extending collar with a plurality of fastener-receiving means, and a plurality of fasteners passing through the ring and into the fastener-receiving means for tightening the ring against the piston and apply an axial force thereagainst, whereby application of said axial force upon the piston operates against the pressure medium and is reacted by a reaction force extending only through the sleeve.

7. Arrangement as claimed in claim 6 in which said collar piston and annular ring are formed as one integral pressure element.

8. Arrangement as claimed in claim 6 in which said fastener-receiving means are threaded holes and said fasteners are screws.

9. Arrangement as claimed in claim 6 in which the collar piston is freely movable axially in the sleeve recess and may be pressed against the pressure medium by tightening at least three fasteners symmetrically disposed about the circumference of the ring.

10. Arrangement as claimed in claim 6 in which the recess has two annular shoulders provided therein spaced from the closed end thereof, one shoulder being provided in the outer wall of the recess and the other shoulder being provided in the inner wall thereof, a washer disposed in the recess resting against the shoulders, the pressure medium being disposed between the washer and the piston such that movement of the piston into the recess forces the pressure medium against the washer.

* * * * *